June 16, 1964  R. E. KRUEGER  3,137,158
AIR DENSITY METER
Filed Jan. 12, 1962
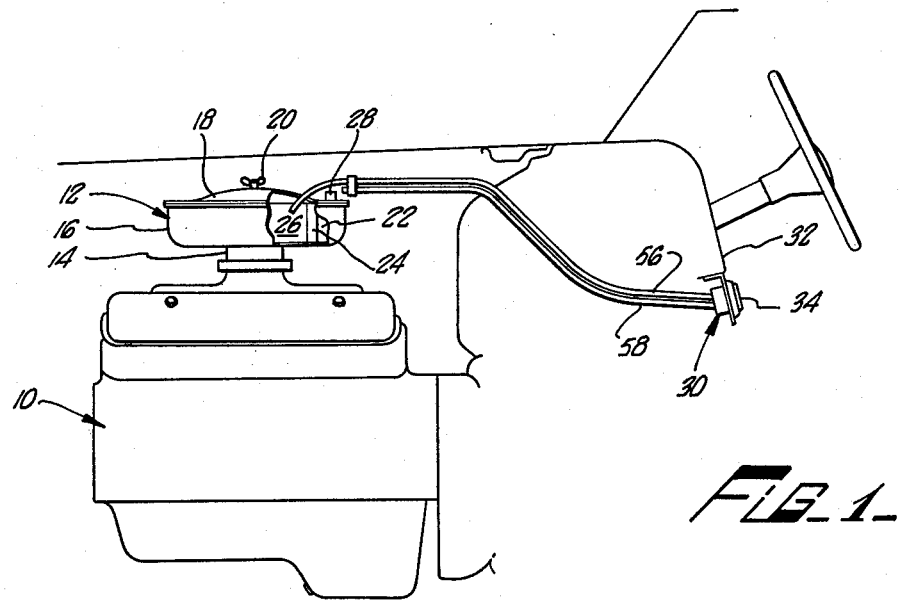
FIG_1_
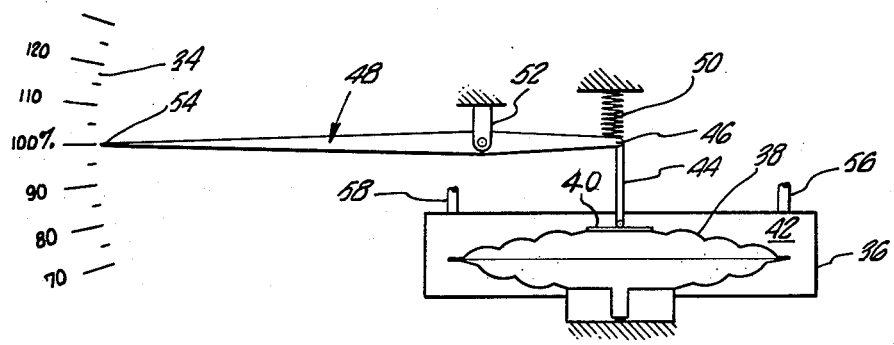
FIG_2_
INVENTOR.
RUDOLPH E. KRUEGER
BY
Christie, Parker & Hale
ATTORNEYS.

United States Patent Office 3,137,158
Patented June 16, 1964

3,137,158
AIR DENSITY METER
Rudolph E. Krueger, 2446 N. Orchard Drive, Burbank,
Calif., assignor of one-half to Woodson C. Deeds,
North Hollywood, Calif.
Filed Jan. 12, 1962, Ser. No. 165,822
3 Claims. (Cl. 73—30)

This invention relates to a measuring device and, more particularly, to an air density meter.

In the operation of internal combustion engines, power output is affected by changes in air density. A means for convenient determination of air density therefore becomes of considerable importance in activities, such as boat or automobile racing, where a premium is placed on maximum engine output. Accurate comparison of engine performance requires data as to air density. In addition, maximum engine output requires that fuel-air mixture ratios be adjusted as a function of air density changes. Where an engine has been tuned for maximum output at one air density condition, a change in air density may require replacement of the main carburetor jets to compensate for such change. For example, a reduction in air density of about 6% requires that the jet area in the carburetor should be reduced by approximately 6% to maintain maximum output.

The present invention is a density meter comprising a cell which has a volume of gas sealed within it and is deflectable responsive to the summation of temperature and pressure variations, and a dial face calibrated in indicia of density. An indicating means is associated with the dial face. Means are adapted to the indicating means to move such means relative to the dial face responsive to deflections of the deflectable cell.

The present invention also encompasses a density meter in combination with an engine including an air inlet and an air passage between the air inlet and a point of fuel-air mixing. The density meter includes a case defining a chamber within which a deflectable cell having a volume of gas sealed within it is disposed. A first conduit means interconnects the chamber and a point in the air passage, and a second conduit means interconnects the chamber and a point adjacent the air inlet. The density meter also includes a dial face calibrated in indicia of density, and means associated with the dial face and movable responsive to deflections of the cell. This structure allows the density meter to be positioned at a distance from the engine, as, for example, on the dashboard of a vehicle, while providing means for bringing air from the vicinity of the air inlet of the engine to envelop the deflectable cell within the chamber of the density meter. The deflectable cell is therefore responsive to the summation of temperature and pressure of the air actually entering the engine. In combination with an engine including a carburetor and an air cleaner having an air inlet and a filter between the air inlet and the carburetor, the first and second conduit means of the air density meter interconnect the chamber and a point between the filter and the carburetor, and the chamber and a point adjacent the air inlet, respectively.

The structure of the air density meter of the present invention, as well as its operation and use, will be more fully understood from the following description made in conjunction with the accompanying drawings in which:

FIGURE 1 is a schematic representation showing an air density meter according to the present invention in combination with an internal combustion engine of an automotive vehicle; and FIGURE 2 is a schematic representation of an embodiment of the density meter according to the present invention.

With reference to FIGURE 1, an internal combustion engine, generally indicated by reference character 10, includes an air cleaner 12 mounted on top of a carburetor 14. The air cleaner may be of any type suitable for ridding air of dust and grit prior to mixing of the air with fuel. The air cleaner shown is one typically used and includes a body 16 and a cover 18 releasably secured to the body by a wing nut 20. The air cleaner is internally arranged with an air inlet chamber 22 separated by a filter 24 from an air outlet chamber 26. An air inlet 28 provides flow communication between the air inlet chamber and a source of air. While not shown, an opening in the bottom of the air cleaner provides flow communication between the air outlet chamber and the carburetor. Outside air enters through the air inlet into the air inlet chamber, and then passes through the filter into the air outlet chamber from which it passes into the carburetor where it is mixed with fuel prior to ignition of the combustible mixture in the cylinders of the engine. Flow of air through the filter results in a pressure drop so that a small pressure differential exists between air within the air outlet chamber and air entering the air inlet.

An air density meter, generally indicated by reference character 30, is mounted on a dashboard 32 of the vehicle so that a dial face 34 is visible from the passenger side of the vehicle. A case 36, mounted on the engine side of the dashboard, includes the sensing element of the density meter, as will now be described in greater detail.

With particular reference to FIGURE 2, a schematic representation of one embodiment of the air density meter according to the present invention is shown. A bellows 38, sealed with a volume of gas within it by a plug 40 of solder, is disposed within a chamber 42 defined by case 36. A force rod 44 is joined to the top of the bellows and engages an end 46 of an indicating means or pointer 48. End 46 of the pointer is held in engagement with the force rod by a spring 50 biased between the end of the pointer and a convenient fixed surface. A pivot connection 52 provides a fulcrum point intermediate end 46 and the other end, designated 54, of the pointer. End 54 of the pointer is associated with dial face 34 and is movable with respect to the indicia of density shown on the dial face.

A first tube 56 provides a flow conduit between chamber 42 of the density meter and air outlet chamber 26 of the air cleaner. A second tube 58 provides a flow conduit between chamber 42 and air inlet 28 to the air cleaner. Flexible plastic tubes of ¼" I.D. may be conveniently used. Since the flow of air through filter 24 of the air cleaner produces a pressure drop, a pressure differential exists between the end of tube 56 in the air outlet chamber of the air cleaner and the end of the tube adjacent air inlet 28 of the air cleaner. As a result of this pressure differential, air flows from around the air inlet through tube 58 into chamber 42 of the density meter, and then through tube 56 into the air outlet chamber of the air cleaner. By this means, the air in the chamber of the density meter surrounding bellows 38 is at the same condition of density as the air entering the engine through the air cleaner. It will be understood that the use of tubes as described can be made at other points of the air passage into the engine provided a pressure differential sufficient to produce flow as herein described is obtained.

In operation, the bellows is sealed to enclose a sample volume of gas and provide a predetermined bellows height. End 54 of pointer 48 is adjusted so that at sea level conditions of barometric pressure of 29.92 inches Hg and an air temperature of 59° F., the end of the pointer indicates 100% on dial face 34. For purposes of calibration, changes in density from sea level conditions are produced by varying either temperature or pressure of the gas surrounding the bellows. Indicia are placed on the dial face corresponding to the change in density from the 100% condition as reflected by displacements of pointer 48 responsive to change in height of the bellows.

In use, changes in temperature or pressure, or simultaneous changes of both, produce a deflection of the bellows resulting in a movement of the pointer to reflect the corresponding change in air density. Based upon the density indicated on the dial face, appropriate correction in jet sizes used in engine carburetors can be made. By the use of the density meter of the present invention, power output of an engine can be adjusted to sea level conditions providing thereby an accurate comparison with previous tests.

While the air density meter of the present invention has been particularly described with reference to internal combustion engines, it will be understood that it can be advantageously used in aircraft with jet engines. The air density meter provides a convenient means for determining air density so that the permissible load of the aircraft at take-off under the prevailing atmospheric conditions can be readily computed.

I claim:

1. In combination with an engine including an air inlet and an air passage between the air inlet and a point of air-fuel mixing, a density meter comprising:
   (a) a case defining a chamber;
   (b) a cell disposed in the chamber, said cell having a volume of gas sealed within it and deflectable responsive to the summation of temperature and pressure variations;
   (c) a dial face calibrated in indicia of density;
   (d) means associated with the dial face to move relative to the dial face responsive to deflections of the cell;
   (e) first conduit means interconnecting the chamber and a point in the air passage; and
   (f) second conduit means interconnecting the chamber and a point adjacent the air inlet.

2. In combination with an engine including a carburetor and an air cleaner having an air inlet and a filter between the air inlet and the carburetor, a density meter comprising:
   (a) a case defining a chamber;
   (b) a cell disposed in the chamber, said cell having a volume of gas sealed within it and deflectable responsive to the summation of temperature and pressure variations;
   (c) a dial face calibrated in indicia of density;
   (d) means associated with the dial face to move relative to the dial face responsive to deflections of the cell;
   (e) first conduit means interconnecting the chamber and a point between the filter and the carburetor; and
   (f) second conduit means interconnecting the chamber and a point adjacent the air inlet.

3. In combination with an engine including a carburetor and an air cleaner having an air inlet and a filter between the air inlet and the carburetor, a density meter comprising:
   (a) a case defining a chamber;
   (b) a bellows disposed in the chamber, said bellows having a volume of gas sealed within it and deflectable responsive to the summation of temperature and pressure variations;
   (c) a dial face calibrated in indicia of density and mounted in a location removed from the engine;
   (d) a pointer associated with the dial face;
   (e) means connected to the pointer to move the pointer relative to the dial face responsive to deflections of the bellows;
   (f) a first tube interconnecting the chamber and a point between the filter and the carburetor; and
   (g) a second tube interconnecting the chamber and a point adjacent the air inlet.

References Cited in the file of this patent

UNITED STATES PATENTS 2,000,308    Von Schutz _____ May 7, 1935

OTHER REFERENCES

"A New Altimeter," Scientific American, October 1929, page 337.